United States Patent [19]

Yamazaki et al.

[11] Patent Number: 5,004,889
[45] Date of Patent: Apr. 2, 1991

[54] LASER POWER CONTROLLING METHOD

[75] Inventors: Etsuo Yamazaki, Hachioji; Nobuaki Iehisa; Kazuhiro Suzuki, both of Minamitsuru, all of Japan

[73] Assignee: Fanuc Ltd., Minamitsuru, Japan

[21] Appl. No.: 343,260

[22] PCT Filed: Sep. 3, 1988

[86] PCT No.: PCT/JP88/00891
§ 371 Date: Apr. 17, 1989
§ 102(e) Date: Apr. 17, 1989

[87] PCT Pub. No.: WO89/02335
PCT Pub. Date: Mar. 23, 1989

[30] Foreign Application Priority Data

Sep. 10, 1987 [JP] Japan .................................. 62-226791

[51] Int. Cl.$^5$ ............................................. B23K 26/00
[52] U.S. Cl. ............................ 219/121.61; 219/121.62; 364/474.08
[58] Field of Search ...................... 219/121.61, 121.62, 219/121.82; 364/474.08

[56] References Cited

U.S. PATENT DOCUMENTS 4,870,560  9/1989  Seki et al. ................. 364/474.08 X
4,914,599  4/1990  Seki et al. ..................... 364/474.08

OTHER PUBLICATIONS

Patent abstracts of Japan, vol. 9, No. 77 (M-369) (1800) Apr. 6, 1985, & JP-A-59 206192 (Mitsubishi Denki K.K) Nov. 22, 1984.

Primary Examiner—C. L. Albritton
Attorney, Agent, or Firm—Staas & Halsey

[57] ABSTRACT

A laser power controlling method in which a laser output is controlled by an NC instruction as a function of an instruction regarding the moving speed of a mechanical system. The moving speed instruction is inputted to a simulator approximated to the mechanical system with a first-order or second-order function, and based upon the results operated by the simulator, a laser instruction value is generated, so that synchronism between the moving speed of the mechanical system and the laser output control is assured. Therefore, the moving speed of the mechanical system is synchronized with the power of the laser beam projected onto a workpiece to thus enhance cutting performance.

2 Claims, 3 Drawing Sheets

LASER POWER CONTROLLING METHOD

TECHNICAL FIELD

The present invention relates to a method for controlling laser power, and more particularly to such a method for improving a synchronism between a moving speed of the machine system and the laser output control.

BACKGROUND ART

Laser machining apparatuses have been extensively used in conjunction with numerical control systems, since such an arrangement facilities complex shape machining of a workpiece at high speed. Generally, no problems exist in machining a workpiece along a straight line or a curve of a large radius of curvature. However, if the output of the laser beam is not controlled in accordance with the moving speed of the workpiece during machining of corner portions or acutely angled edge portions thereof, welding losses occur due to build up of thermal energy and excessive heat absorption, resulting in decreased machining accuracy and causing to degradation of the material of the workpiece.

In order to avoid such drawbacks, a laser output controlling method has been proposed in Japanese patent application No. 62-107824 whereby the laser output is controlled in accordance with machining speed during machining of edge portions.

Conventionally, as in the above-mentioned application, the laser output is controlled in response to an instructions regarding the moving speed of the workpiece as calculated by a machining program.

However, with such a laser output controlling method, there is a significant time delay between the occurrence of the instruction and the movement of the mechanical system controlled by the instruction due to the inertia of the mechanical system. On the other hand, substantially no time delay is involved in outputting the laser beam, since the laser output is controlled by a current flowing in a discharge tube.

Specifically, the response time of the laser output is smaller by approximately a factor of two than that of the mechanical system. The control of the laser output in response to the moving instructions for the mechanical system causes a loss of synchronism between the moving speed of a work table and the laser output. For this reason, there have been cases where machining accuracy and machining performance were not sufficiently attained.

DISCLOSURE OF THE INVENTION

An object of the present invention is to resolve the above mentioned problems and to provide a laser power controlling method in which the synchronism between the moving speed of a machine system and the laser output control is improved.

In order to resolve such problems, a laser power controlling method is provided where in the laser output is controlled by a numerical control (NC) instruction as a function of an instruction regarding the moving speed of a mechanical system, the method comprising the steps of:

Providing an instruction regarding said moving speed to a simulator approximated to a mechanical system with a first-order or second-order function and generating a laser output instruction based on the result obtained by said simulator, whereby synchronism between the moving speed of the mechanical system and the laser output control is assured.

By providing the moving speed instruction to the simulator which has the basic characteristics of the mechanical system, the movement of a workpiece mounted on a table may be synchronized with the laser power output irradiated onto the workpiece, thereby improving cutting performance.

BEST MODE FOR CARRYING OUT THE INVENTION

One embodiment of the present invention will be described with reference to the drawings.

Figure 1:
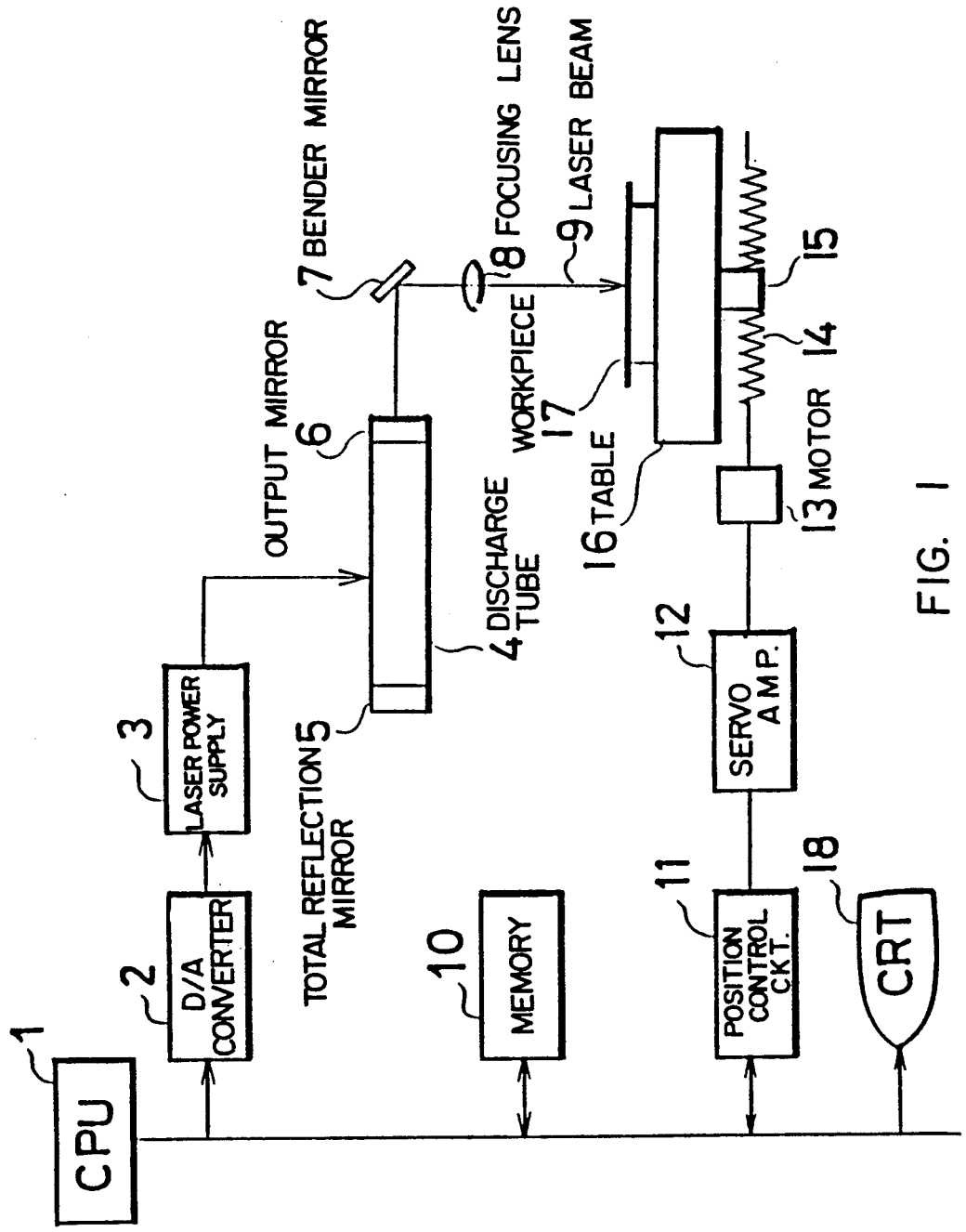
FIG. 1 is a block diagram showing an arrangement of an apparatus which may be used for carrying out the method according to one embodiment of the present invention.

FIG. 1 is a block diagram showing an arrangement of an apparatus used in carrying out a method according to one embodiment of the present invention. In FIG. 1, a central processing unit 1 serves to control the operation of the entire apparatus. A D/A converter 2 is connected to the central processing unit 1 for receiving a digital instruction outputted from unit 1 and converting it to an analog instruction. A laser power supply 3 is connected to the D/A converter 2, for outputting a high frequency voltage corresponding to the analog instruction fed from the D/A converter 2 by rectifying a commercial power supply voltage. A laser gas is circulated, in the interior of a discharge tube 4 and the laser gas is excited by the application of the high frequency voltage supplied from the laser power supply 3. A total reflection mirror 5 for reflecting the laser light and an output mirror 6 are disposed in confrontation, at opposite ends of the tube 4. The laser light reciprocates between mirrors 5 and 6, receives energy from the excited laser gas and is amplified, and a part of the laser light is delivered to the outside of tube 4 through output mirror 6. The direction of the laser light 9 delivered from tube 4 is changed by a bender mirror 7 and the redirected light 9 is projected onto a workpiece 17 through a focusing lens 8.

A nonvolatile bubble memory 10 stores a machining program and various kinds of parameters. The output of a position control circuit 11 is amplified by a servo amplifier 12 and applied to a servo motor 13 to control the rotations of the latter, and the movement of a table 16 is in turn controlled by a ball screw 14 and a nut 15 to thus control the positioning of the workpiece 17. Although a single position control circuit 11 is shown for illustrating the positional control in one axial direction two position control circuits are required in actuality for the positional control of the workpiece in two axial directions. The apparatus includes a display device 18, for which a CRT or a liquid crystal display unit is employed.

The central processing unit reads the machining program stored in the memory , decodes the instructions, and outputs an amount of shift of each of the axes to the position control circuit 11. The central processing unit 1 further calculates the moving speed of the table 16 based upon the amount of shift per unit of the time, and calculates a laser output instruction value from equation (1) presented below by using the results obtained by first-order or second-order filtering of the moving speed data. The laser output instruction value is outputted to he D/A converter 2.

$$W = K \times Y_1 + W_O \quad (1)$$

where W represents the laser output instruction value $Y_1$ represents a simulated feeding speed; K is a constant: and $W_o$ is a constant equivalent to the laser output when the feeding speed is zero.

The laser power supply 3 is supplied with an analog voltage from the D/A converter 2 and applies a voltage to the discharge tube 4 to control current flowing therein.

The discharge tube 4 is provided with the total reflection mirror 5 and the output mirror 6 at opposite ends thereof so as to constitute a Fabry-Perot oscillator, in which the laser beam produced by the discharge is amplified and delivered to the outside of tube 4. The direction of the laser beam 9 outputted from the laser oscillator is changed by the bender mirror 7, focused to a small spot beam by the focusing lens 8 and is then projected onto the workpiece 17.

Figure 2:
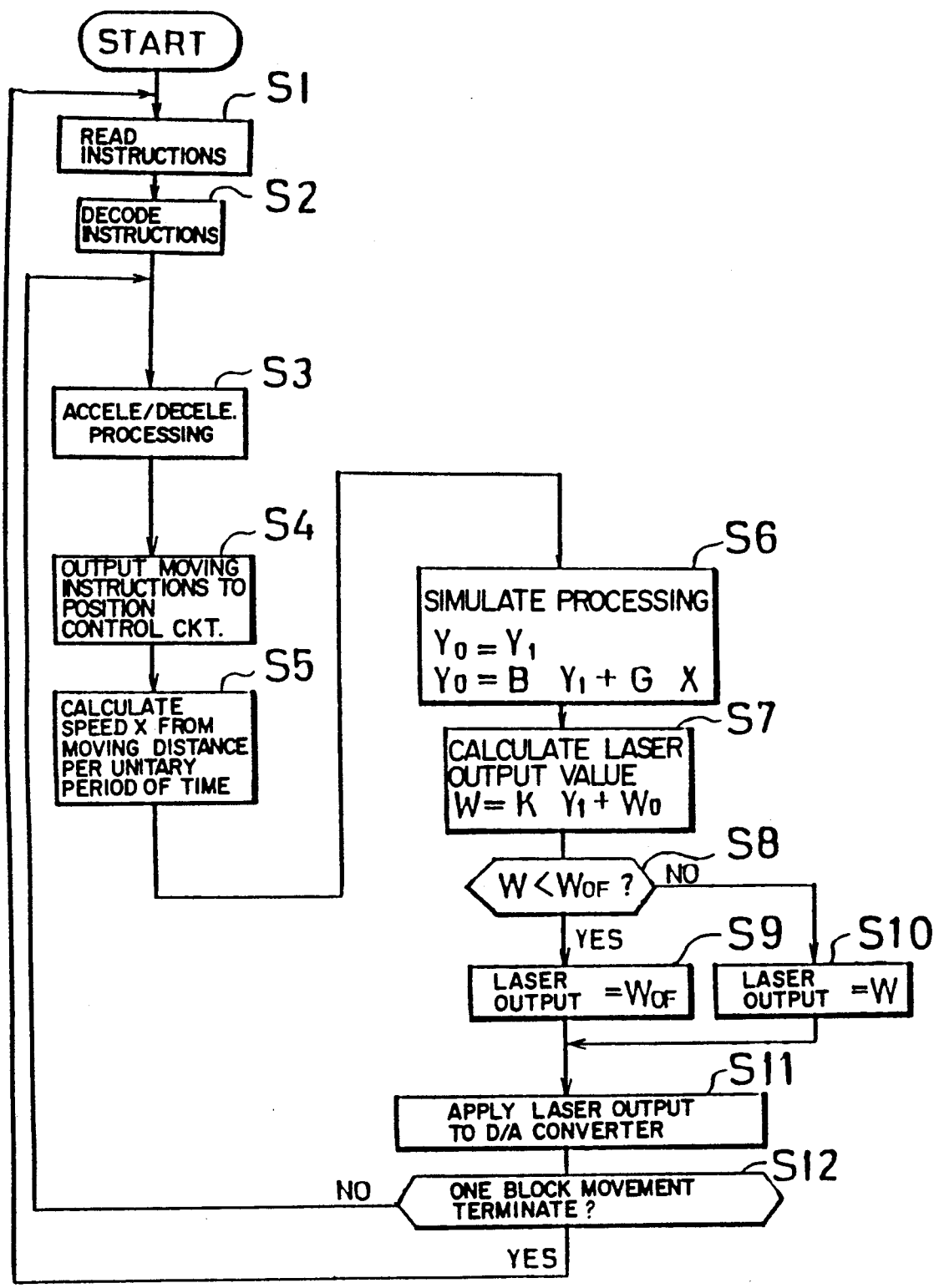
FIG. 2 is a flowchart illustrating the software for processing the method according to the embodiment of an invention.

Next, description will be made with respect to the software processing instructions for carrying out the method according to this embodiment. FIG. 2 is a flowchart illustrating such software, in which numerals following a character "S" represent step numbers.

[S1], [S2]: The central processing unit 1 reads the machining program and decodes instructions.

[S3]: An acceleration/deceleration processing step is executed, in which for the acceleration/deceleration, an acceleration/deceleration instruction is used as a moving instruction. When acceleration/deceleration is not needed, an ordinary instruction is used as the moving instruction.

[S4]: The respective moving instructions are outputted to the position control circuit 11.

[S5] The speed X is calculated from the moving instruction value per unit of time.

Figure 3:
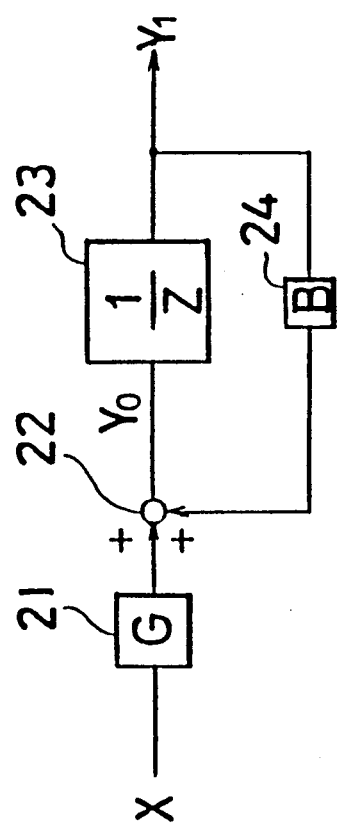
FIG. 3 is a block diagram illustrating first-order simulation processing.

[S6]: Simulate processing is executed for the speed X. The simulator approximated to the mechanical system is the same in procedure as a digital filter. Exemplified herein is a first-order delay procedure. Shown in FIG. 3 is a block diagram illustrating the simulate processing, in which reference numeral 21 denotes a constant; numeral 22 denotes an operation unit: numeral 23 denotes an integration element; and numeral 24 denotes a feedback constant. As indicated, output $Y_1$ is obtained by the following equations.

$$Y_1 = Y_0) \ldots \quad (1)$$

$$Y_0 = B \times Y_1 + G \times X \ldots \quad (2)$$

where B and G are constants dependent on the mechanical characteristics of the system. Substituting data regarding the moving speed instruction as obtained from the moving instruction for the input X of the above filter and executing the program according to the above equations (1) and (2), $Y_1$ is obtained.

S7] Using $Y_1$, a laser output instruction value is generated in accordance with the following equation to give a laser output instruction in which the delay of the mechanical system is taken into consideration.

$$W = K \times Y_1 + W_O$$

where W is the laser output instruction value; $Y_1$ is a feed speed instruction in which the mechanical characteristic is taken into consideration; K is a constant; and $W_O$ is a constant which is equivalent to a laser output when the speed is zero.

[S8]: The laser output W as calculated is compared with a minimum machining output $W_{OF}$. When W is smaller than $W_{OF}$, $W_{OF}$ is outputted [S9], when W is larger than $W_{OF}$, W is used as the laser output [S10]. It is for this reason that the calculated output W does not fall below the minimum machining output $W_{OF}$.

[S11] The laser output W is converted to an analog output by the D/A converter 2, and the analog output is applied to the laser power supply 3 to thereby control the laser output.

[S12]: A check is made to determine whether or not execution for one block moving instruction has been completed. If YES, the program returns to S1 in which to read a net block, whereas if NO, the program proceeds to S3 where the moving processing is continued.

As described, by simulating the delay of the mechanical system, it is possible to obtain a laser output in correspondence to the actual speed of the mechanical system. As a result, the speed of the machine and the laser output are accurately in coincidence with each other and the laser machining accuracy is enhanced.

Although in the above-description the simulator of simulating the mechanical system is of the first-order, it is possible to process the simulator with second order procedure.

As described above, according to the present invention, a machine moving instruction is inputted to a simulator having the basic characteristics of the mechanical system, so that the movement of the workpiece mounted on a table of the machine is synchronized with the power of the laser beam irradiated onto the workpiece. Therefore, the machining speed can be in exact coincidence with the laser output and the machining accuracy and the machining performance are improved.

We claim:

1. A laser power controlling method in which a laser output is controlled by an NC instruction as a function of an instruction regarding the moving speed of a mechanical system, the method comprising the steps of:
   providing an instruction regarding moving speed to a simulator approximated to said mechanical system with a first-order or second-order function; and
   generating a laser output instruction based on the result obtained by said simulator,
   whereby synchronism between the moving speed of the mechanical system and the laser output control is assured.

2. A laser power controlling method according to claim 1, wherein said simulator uses a digital simulator technique.

* * * * *

UNITED STATES PATENT AND TRADEMARK OFFICE
CERTIFICATE OF CORRECTION

PATENT NO. : 5,004,889
DATED : APRIL 2, 1991
INVENTOR(S) : ETSUO YAMAZAKI ET AL.

It is certified that error appears in the above-identified patent and that said Letters Patent is hereby corrected as shown below:

Col. 1,  line 7, "a" (both occurrences) should be --the--;
         line 8, "the" (both occurrences) should be --a--;
         line 32, "an" should be deleted;
         line 61, "where in" should be --wherein--;
         line 66, "Providing" should be --providing--; and "said" should be deleted;
         line 68, "function" should be --function;--.

Col. 2,  line 19, "the" (second occurrence) should be --an--;
         line 20, "an" should be --the--;
         line 67, "unit" should be --unit 1--;
         line 68, "memory" should be --memory 10--.

Col. 3,  line 9, "he" should be --the--;
         line 13, "value" should be --value;--.

Col. 4,  line 37, "of" should be --for--.

Signed and Sealed this

Sixth Day of October, 1992

Attest:

DOUGLAS B. COMER

Attesting Officer    Acting Commissioner of Patents and Trademarks